United States Patent [19]

Derrick

[11] Patent Number: 4,998,950
[45] Date of Patent: Mar. 12, 1991

[54] CENTER COMPENSATING MASTER CYLINDER

[75] Inventor: Dennis D. Derrick, Xenia, Ohio

[73] Assignee: General Motors Corporation, Detroit, Mich.

[21] Appl. No.: 474,575

[22] Filed: Feb. 2, 1990

[51] Int. Cl.[5] ............................................ B60T 11/20
[52] U.S. Cl. ....................................... 60/562; 60/588; 60/533
[58] Field of Search ................ 60/533, 562, 585, 589, 60/588, 589

[56] References Cited

U.S. PATENT DOCUMENTS

| | | | |
|---|---|---|---|
| 3,068,651 | 7/1960 | Shutt | 60/562 |
| 3,659,421 | 5/1972 | Wilson et al. | 60/562 |
| 4,550,567 | 11/1985 | Schaefer | 60/562 |
| 4,553,395 | 11/1985 | Price et al. | 60/589 |
| 4,621,498 | 11/1986 | Schaefer | 60/562 |
| 4,707,989 | 11/1987 | Nakamura et al. | 60/562 |

FOREIGN PATENT DOCUMENTS

| | | | |
|---|---|---|---|
| 0045233 | 2/1982 | European Pat. Off. | 60/562 |
| 2164604 | 9/1977 | Fed. Rep. of Germany | 60/562 |
| 652635 | 2/1963 | Italy | 60/562 |
| 0032271 | 3/1978 | Japan | 60/562 |
| 0796020 | 1/1981 | U.S.S.R. | 60/562 |

Primary Examiner—Edward K. Look
Assistant Examiner—Thomas Denion
Attorney, Agent, or Firm—Ernest E. Helms

[57] ABSTRACT

A dual chamber master cylinder has a center compensation valve for fluid compensation of the secondary pressurizing chamber, eliminating lip seal damage to the secondary pressurizing piston seal that can occur when a bypass port is provided in the wall of the secondary pressurizing chamber. Center compensation is accomplished through a passage connecting the secondary pressurizing chamber, under control of the compensation valve, to a common compensation chamber for both the primary and the secondary pressurizing chambers. In the preferred embodiment the common compensation chamber is the quick take-up chamber of the master cylinder. This provides quick take-up pressure to both pressurizing chambers upon initial master cylinder actuation.

5 Claims, 1 Drawing Sheet

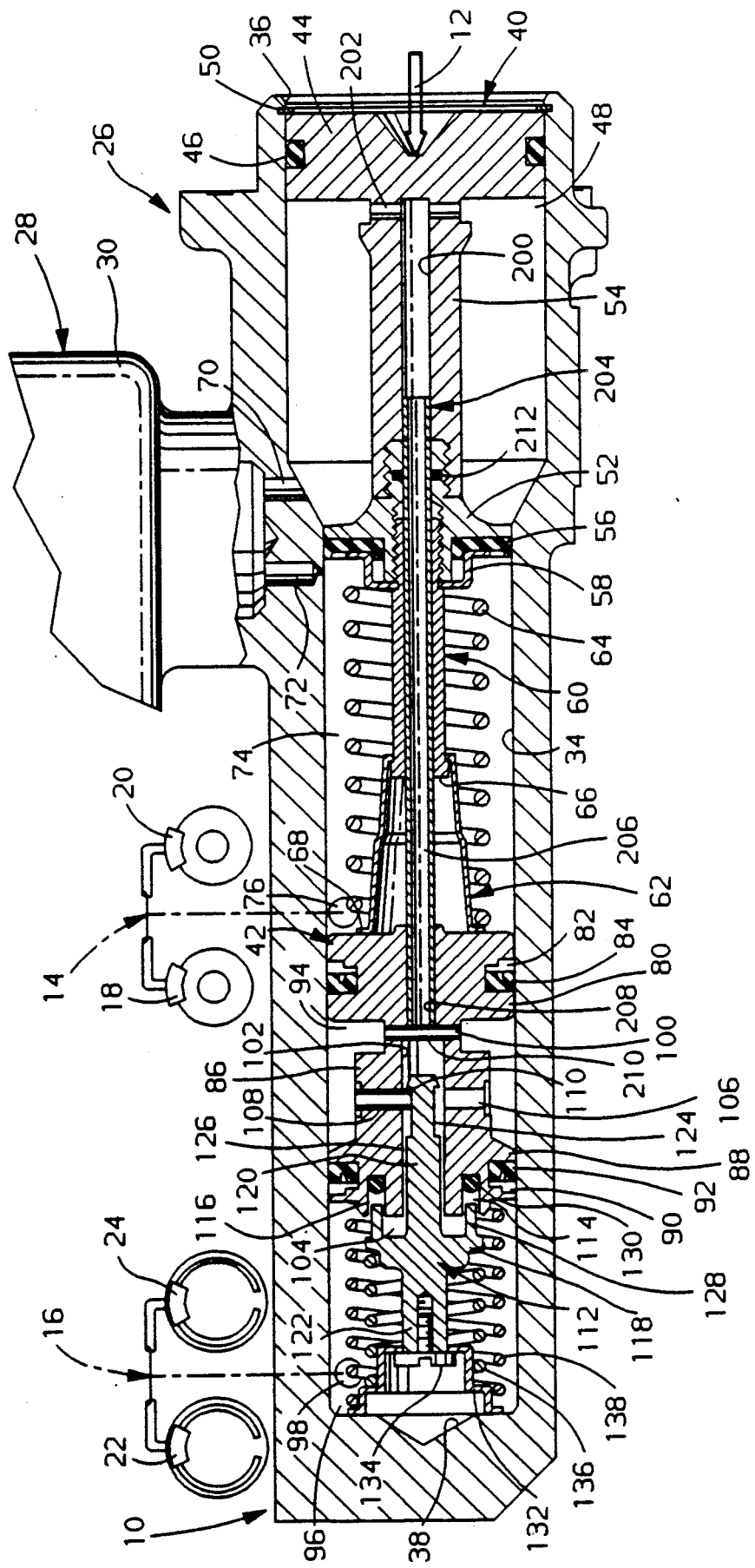

CENTER COMPENSATING MASTER CYLINDER

BACKGROUND OF THE INVENTION

This is an improvement of the invention disclosed and claimed in U.S. patent application Ser. No. 331,930 entitled, "Center Compensating Master Cylinder", filed on Apr. 3, 1989, and assigned to the common assignee.

Typical master cylinders in use in automotive vehicles for many years are of the dual or tandem type; that is, they have two pressurizing chambers in a common bore having a closed end and an open end, with brake fluid being pressurized by a primary pressurizing piston and a secondary pressurizing piston arranged in tandem in the bore. One of the chambers is typically connected to one brake circuit, such as one containing the vehicle front brakes, and the other chamber is typically connected to another brake circuit containing the vehicle rear brakes. At times other circuit arrangements, and even additional pressurizing chambers, are used.

Such a master cylinder usually has a pair of holes in the main body adjacent each of the primary and secondary pressurizing piston seals The holes are connected with the master cylinder reservoir and extend to the bore. One of the holes is a compensation port located behind the seal of the associated piston. The other hole is a bypass hole positioned in front of the seal of the associated piston. When the master cylinder is actuated, the seals move across their respective bypass holes so that these holes are no longer fluidly connected with the pressurizing chambers, and the brake fluid in those chambers and the brake circuits connected with them can be pressurized to actuate the brakes. These seals are usually cup-like or V-block seals with lips which are subject to seal extrusion into the bypass holes under some conditions, resulting in damage to the seal and loss of full functioning pressure generation for the brake circuit associated with the damaged seal. In normal service braking operation, there is little pressure in the pressurizing chambers until the bypass holes are closed, so extrusion into those holes is minimized. However, with the advent of systems variously referred to as anti-lock, anti-skid, wheel lock control, or anti-block systems the modulation of brake pressures in the brake circuits when that type system is operating can cause rapid travel of the secondary pressurizing piston seal back and forth across the front bypass hole. That is the bypass hole associated with the forward pressurizing chamber in the master cylinder bore.

The structure disclosed in the above noted patent application and embodying the invention claimed therein eliminated the usual front bypass hole over which the secondary pressurizing piston pressure seal must pass, thereby obviating the possibility of damage to that seal because of extrusion into such a bypass hole. That invention provided an internal path substantially along the center of the secondary pressurizing piston for brake fluid compensation and bypass for the secondary pressurizing chamber and its brake circuit, this being referred to herein as center compensation. That structure included a valve located on the secondary pressurizing piston within the master cylinder bore. The valve was open while the master cylinder was at the rest or released position, and was closed by actuating movement of the secondary pressurizing piston. It reopened when the secondary pressurizing piston was being returned to its rest position. The primary pressurizing chamber was compensated in the same manner as before, with the piston cup seal passing over the bypass hole during each master cylinder actuation operation and each release operation. Each compensation path was connected to its own reservoir or reservoir compartment.

SUMMARY OF THE INVENTION

Instead of providing a compensation port only for the secondary pressurizing chamber by means of center compensation, the invention herein disclosed and claimed provides for compensation of the secondary pressurizing chamber and the brake circuit connected to it by the same compensation port and compensation chamber that provides compensation for the primary pressurizing port. When used with a quick take-up master cylinder, the compensation fluid is provided to and from the reservoir through the quick take-up pressurizing chamber, which is then the common compensation chamber, with the additional benefit of providing quick take-up pressure through the center compensation system from the quick take-up pressurizing chamber to the secondary pressurizing chamber as well as being provided to the primary pressurizing chamber in the usual manner. This is accomplished by providing a tube secured to the secondary pressurizing piston so that the tube interior is in fluid communication with the secondary pressurizing chamber under control of the center compensation valve. The tube is also slidably and sealingly received in a bore formed in the primary pressurizing piston, that bore being in continuous fluid communication with the quick take-up chamber. If the master cylinder bore is not provided with a larger diameter quick take-up chamber, the tube interior and primary pressurizing piston bore are connected through an annular common compensation chamber formed by the primary pressurizing piston and the rearward portion of the master cylinder bore to the compensation port connected with the master cylinder reservoir.

BRIEF DESCRIPTION OF THE DRAWING

The single FIGURE is a cross section view of a master cylinder assembly embodying the invention, with parts broken away and brake circuits to which the master cylinder is connected being shown schematically.

DESCRIPTION OF THE PREFERRED EMBODIMENT

The master cylinder assembly 10 illustrated is of the tandem type having a quick take-up feature such as that in common use in recent years. The assembly 10 is schematically shown being connected to a master cylinder operator which exerts actuating force typified by the arrow 12, to a vehicle front brake circuit 14 and to a vehicle rear brake circuit 16. Front brake circuit 14 has the two front wheel brakes 18 and 20 arranged to be actuated by hydraulic pressure in that circuit. These brakes are schematically illustrated as being disc brakes which benefit from the quick take-up action of the master cylinder. Rear brake circuit 16 has the two rear wheel brakes 22 and 24 arranged to be actuated by hydraulic pressure in that circuit. These brakes are schematically represented as being drum brakes. They may also be disc brakes, however. In either instance they may advantageously benefit from quick take-up actuation.

Assembly 10 includes the master cylinder housing or body 26 and the schematically illustrated reservoir 28.

The reservoir may have one or more compartments containing a supply of hydraulic brake fluid. It is illustrated as being a single compartment 30. However, it may have a first compartment and a second compartment which normally contain supplies of hydraulic brake fluid. The compartments may be fluidly separate or interconnected in a manner well known in the art. If it has first and second compartments, they may serve parallel master cylinder bodies such as body 26, including the mechanisms contained therein. Such an arrangement would then supply two additional brake circuits, permitting other types of split system arrangements as well as using brakes actuatable by both or either of two separate brake circuits. For the purposes of preferred embodiment disclosure as well as simplification, however, further description will be concerned with the single compartment reservoir and a single master cylinder body with its mechanisms, including a quick take-up arrangement.

The body 26 is illustrated as having a stepped bore 34 formed therein which is open at the rear end 36 of the body and is closed at the body front end 38. A stepped primary pressurizing piston 40 is reciprocably received in the rear portion of bore 34 and a secondary pressurizing piston 42 is reciprocably received in the front portion of bore 34.

Primary pressurizing piston 40 has a rear land 44 provided with a circumferentially extending seal 46. Seal 46 is in slidable sealing engagement with the bore wall. The enlarged rear portion of bore 34 in which piston land 44 and seal 46 are positioned provides a quick take-up chamber 48. As will be further described, chamber 48 also functions as a common compensation chamber. A stop 50, shown as a C-ring received in an internal groove at the bore rear end, provides a stop for piston 40 when the master cylinder is at the rest or fully released position shown. This stop, in conjunction with the returning action of the piston return springs noted below, establishes the rest or released positions of the pistons 40 and 42.

Piston 40 has a front land 52 connected with rear land 44 by a reduced diameter piston portion 54. Front land 52 is of smaller diameter than rear land 44, and fits within the smaller diameter part of bore 34 located forward of quick take-up chamber 48. Chamber 48 is the annular chamber located axially between the rear land 44 and the front land 52 and about the reduced diameter piston portion 54. In the rest or released position shown, its cylindrical wall is defined by the wall of the enlarged part of the stepped bore 34 at the rear end of the body 26. As the master cylinder is actuated, the volume of chamber 48 is decreased as the primary pressurizing piston 40, and therefore the chamber 48, is moved forwardly. The forward part of the chamber is increasingly defined by the smaller diameter part of bore 34 and the rearward part of the chamber is decreasingly defined by the enlarged diameter part of bore 34.

An annular cup-like lips seal 56 fits on the forward face of piston land 52 and is in slidable sealing engagement with the bore wall. An annular seal retainer and spring seat 58 is held in position on the front face of piston 40 by a headed pin 60 extending through the retainer and seat 58 and the seal 56. Another cup-like spring seat and spring retainer 62 is reciprocably mounted on pin 60, which extends part way to the secondary pressurizing piston 42. The primary pressurizing piston return spring 64 is a compression coil spring received about pin 60 and most of seat and retainer 62. Spring 64 has one end engaging the spring seat 58 and the other end engaging the seat end of seat and retainer 62. Spring 64 is captured between spring seats 58 and 62 under compression so that it continually urges spring seat and seal retainer 58 against the face of seal 56 so as to hold that seal in position on the front face of piston land 52. It also continually urges seat and retainer 62 forward so that the portion thereof in sliding engagement with pin 60 is prevented from moving off of the pin by the pin head 66. The spring seat portion 68 of seat and retainer 62 is normally in engagement with the rear face of secondary pressurizing piston 42.

A part of the body 26 has a rear compensation port 70 opening into chamber 48 and in fluid communication with the reservoir rear compartment 30. A rear bypass port 72 opens into the smaller diameter part of bore 34 just forward of the at-rest position of seal 56, and provides fluid communication between the reservoir rear compartment 30 and the primary pressurizing chamber 74 when seal 56 is positioned rearwardly of that port. Seal 56 acts as a check valve between chambers 48 and 74, permitting brake fluid to flow around the outer periphery of land 52 from chamber 48 to chamber 74 when the greater brake fluid pressure is in chamber 48, and preventing flow from chamber 74 to chamber 48 when the greater pressure is in chamber 74. The communication of ports 70 and 72 with the reservoir compartment 30 is controlled by a quick take-up valve arrangement such as any of those disclosed in U.S. Pat. Nos. 4,373,333 issued Feb. 15, 1983; 4,445,333 issued May 1, 1984; and 4,498,299 issued Feb. 12, 1985; by way of example. Such well-known valve arrangements have been in production use for several years, and are not further disclosed, but are incorporated herein by reference.

Primary pressurizing chamber 74 is in the part of bore 34 axially between the primary pressurizing piston 40 and the secondary pressurizing piston 42, and is the chamber in which hydraulic brake fluid is pressurized for brake circuit 14. It is commonly known as the primary pressurizing chamber. A port 76 in the forward upper end of chamber 74 has brake circuit 14 connected thereto to permit brake fluid to flow from the chamber 74 into circuit 14 as brake fluid is being pressurized in that chamber, and to return from circuit 14 into chamber 74 as the primary pressurizing piston 40 is moved rearwardly for brake release. As is well known, when piston 40 moves rearwardly so that the volume of chamber 74 increases at a faster rate than it can be filled by brake fluid from circuit 14, brake fluid from reservoir compartment 30 will flow via port 70 and chamber 48 past piston land 52 and the annular lip of seal 56 into chamber 74. When the lip of seal 56 clears port 72, the pressures in chamber 74 and reservoir compartment 30 will be equalized through port 72.

Secondary pressurizing piston 42 has a rear land 80 provided with a circumferential groove 82 in which the V-block seal 84 is received. That seal is so oriented that it seals any pressure in chamber 74 that is greater than the pressure on the other side of the seal from that chamber, while acting like a check valve (as does the lip of seal 56) to permit fluid flow past the outer periphery of land 80 into chamber 74 should the pressure on the forward side of seal 84 be greater than the pressure in chamber 74.

Piston 42 has a smaller diameter main body portion 86 extending from piston land 80 to a forward piston land 88. Land 88 has a circumferential groove 90 in which another V-block seal 92 is received. Land 88 and seal 92 separate the annular chamber 94 between lands 80 and 88 from the secondary pressurizing chamber 96 located at the forward end of bore 34. Seal 92 is oriented so that it seals any pressure in chamber 96 which is greater that the pressure in chamber 94. A port 98 positioned at the forward upper end of chamber 96 is connected with brake circuit 16 and functions in a similar manner for brake circuit 16 and chamber 96 as does port 76 for brake circuit 14 and chamber 74.

Secondary pressurizing piston main body portion 86 has a cross passage 100 formed through it where land 80 joins the main body portion. An axially extending bore 102 is provided in piston main body portion 86, open at its forward end 104 and connecting at its rearward end with passage 100. Another cross passage 106 is formed in main body portion 86 axially between land 88 and cross passage 100, intersecting bore 102. A retainer pin 108, shown here as a roll pin, is pressed into one side of passage 106 so that its inner end 110 extends into bore 102 to retain the center compensation valve retainer 112 to be described. An annular groove 114 is formed in the forward face of land 88, and is radially outward of bore end 104 and radially inward of the outer circumference of land 88. The forward face of land 88 has a spring locating boss 116 formed to extend slightly forward, boss 116 having a somewhat larger radius than the maximum radius of groove 114.

The center compensation valve retainer 112 has a land 118 axially located near the axial center thereof, so that there is a rearwardly extending pin part 120 and a forwardly extending pin part 122. Pin part 120 has a reduced diameter portion 124 and normally extends into bore 102 so that, when retainer pin 108 is installed, pin end 110 is within the reduced diameter portion 124 and limits the axially outward movement of pin part 120 in bore 102. Pin part 120 is sufficiently smaller in diameter than bore 102 to permit fluid flow through the annular space 126 formed by the pin part and the bore.

Center compensation valve retainer 112 also has a cylindrically formed annular lip 128 which acts as a valve member. Lip 28 extends into groove 114 in radially spaced relation so that fluid may flow around the lip within the groove as it flows between the annular space 126 and the secondary pressurizing chamber 96. An O-ring is positioned in the bottom of groove 114 and forms a valve seat 130 which may be engaged by lip 128 when the valve retainer 112 is positioned sufficiently rearward so as to seal off the fluid flow interconnection between annular space 126 and the secondary pressurizing chamber 96. The valve seat 130 may be formed with other shapes and types of seals, such as a lathe cut seal, if desired It is preferable that it be somewhat resilient as is the typical rubber-like O-ring or lathe cut seal.

Land 118 is substantially smaller in diameter than the diameter of chamber 96, and is formed to provide a spring seat on its forward side which is radially larger than forward pin part 122 but smaller than the outer diameter of the land. The forward end of pin part 122 has a spring seat and retainer 132 secured thereto by screw 134. Inner and outer secondary springs 136 and 138 are compression coil springs. They are concentrically arranged in chamber 96, with their forward ends seated on and retained by spring seat and retainer 132. The rearward end of inner secondary spring 136 is seated on the spring seat formed on the forward side of land 118. The rearward end of the outer secondary spring 138 is seated on the spring seat formed by boss 116 on the forward face of land 80. Spring 138 therefore is radially outward of retainer land 118 but radially inward of the wall of bore 34. Spring 138 is the secondary pressurizing piston return spring, and thus acts on the secondary pressurizing piston 42, continually urging it rearwardly.

Spring 136 acts on the center compensation valve retainer 112 to resist the forward movement of its lip 128 in the direction away from valve seat 130. It has no preload in the rest position shown, so that it does not urge lip 128 to move so far as to close off the center compensation valve formed by that lip and valve seat. It preferably fits tightly around its spring seat on land 118 so as to hold the valve member 128 in this position when the master cylinder is at rest in its fully released condition.

To this point the description of the disclosure, the master cylinder body and the mechanisms therein are much the same as that disclosed in the above noted patent application. The secondary pressurizing piston and center compensation valve assembly, including the secondary springs, may be identical to one used in the application of the invention of the patent application noted above, with only modifications required to particularly adapt it so that it can be used in the application of the invention herein disclosed and claimed. The same is true of the primary pressurizing piston assembly including the caged primary piston return spring, again with modifications required to particularly adapt the primary piston and the caging pin so that they can be used in the application of this invention. The modifications required will be apparent from the following description.

In the structure herein shown and embodying the claimed invention, there is no compensation port communicating the annular chamber 94 with the reservoir through the wall of the master cylinder body much like compensation port 70. Instead, chamber 94 is provided with continuous fluid communication to chamber 48. That chamber is, in turn, in fluid communication with the reservoir. This communication is through a quick take-up valve when chamber 48 is an enlarged diameter part of bore 34 and the forward land 52 of the primary pressurizing piston is smaller in diameter than that piston's rear land 44. When the master cylinder is not constructed as a quick take-up chamber, both lands of the primary pressurizing piston are of the same diameter, and annular chamber 48 is of the same diameter as the primary pressurizing chamber 74. It may then be in communication with the reservoir compartment 30 through the compensation port 70 because it has no separate pressurizing function for providing quick take-up.

Chamber 94 is not needed when no secondary compensation port is provided connecting it to a reservoir compartment. Therefore, if it is economically feasible to manufacture a completely separate secondary pressurizing piston instead of modifying the one used in practicing the invention of the above noted patent application, lands 80 and 88 of that piston may become a single land, still with seals 84 and 92. Cross passage 100 is still needed, and at least one side of passage 106 to accommodate pin 108. It would be more desirable to then make pin 108 as a solid pin to prevent fluid flow out of bore 102 past the pin. The overall axial length of secondary pressurizing piston 42 can be considerably shortened, and the master cylinder body can likewise be axially shortened by this arrangement.

To accomplish compensation for secondary pressurizing chamber 96 and brake circuit 16, the primary pressurizing piston 40 and the pin 60 are provided with a continuous bore 200 which extends from and through the pin head 66 to the rear part of the primary pressurizing piston reduced diameter portion 54 adjacent the piston rear land 44. A cross passage 202 is formed through piston portion 54 so that it intersects bore 200, providing continuous fluid communication between bore 200 and chamber 48. A tube 204 having an axially extending passage 206 therethrough is secured at one end to secondary pressurizing piston 42 so that its passage 206 is in fluid communication with annular chamber 94. This may be accomplished by extending secondary pressurizing piston bore 102 axially through land 80 so that this extension 208 of the bore opens into the portion of bore 102 at cross passage 100 and is in continuous fluid communication with chamber 94 through a part of bore 102 and cross passage 106. A pin 210, which may also be a roll pin, is preferably press fitted into cross passage 100 to provide a stop for one end of the tube 204 as that tube end is press fitted into the bore extension 208. Pin 210 is smaller in outer diameter than the diameter of tube passage 206 so that fluid may readily flow out of and back into the tube passage around the pin. If the shortened secondary pressurizing piston is used as described above, pin 210 may be a solid pin for the same reason that pin 108 may then be a solid pin. The tube 204 is slidably and sealingly received in bore 200 of pin 60 and primary pressurizing piston 40 and is of such a length that it is always in sealing engagement with a seal 212 received in a part of bore 200. This is true even if the secondary pressurizing piston 42 is moved to its maximum pressurizing position and the primary pressurizing piston 40 remains in its released position. At the same time, its length is short enough so that it does not cover up cross passage 202 when the pin head 66 engages the secondary pressurizing piston land 80 because the primary pressurizing piston 40 has moved in the actuating direction without similar movement of the secondary pressurizing piston 42.

The master cylinder assembly is shown in the rest or fully released position in the drawing. It is to be understood that when the rest position of the master cylinder assembly is mentioned, it means the fully released position shown in the drawing. When the master cylinder is actuated by force, indicated by arrow 12, exerted by the master cylinder operator on primary pressurizing piston 40, that piston moves forwardly (leftwardly in the drawing). Some of this force generates quick take-up pressure in chamber 48, as is well known in the art and disclosed in greater detail in the above-noted quick take-up valve arrangement patents, causing a relatively large low pressure brake fluid flow past seal 56 into chamber 74 and brake circuit 14 to quickly move the disc brake pads of brakes 18 and 20 into contact with the discs to be braked. Brake fluid flow and quick take-up pressure are also transmitted from chamber 48 to the secondary pressurizing chamber 96 through cross passage 202, the tube passage 206, bore 102 including the annular space 126 formed by the bore around pin 120, past the compensation valve lip 128 and valve seat 130 into chamber 96. This fluid and pressure is also transmitted to annular chamber 94 from bore 102 through passage 106. It is transmitted to brake circuit 16 from chamber 94, and provides quick take-up of the brakes 22 and 24.

Some of the operator-generated actuating force also acts against the primary pressurizing piston return spring 64. The spring rate of that spring is somewhat greater than the spring rate of secondary pressurizing piston return spring 138 and it is caged under compression, so that some of the actuating force is transmitted through spring 64 to secondary pressurizing piston 42. This begins to move secondary pressurizing piston 42 forwardly.

Initial forward movement of primary pressurizing piston 40 causes the lip of seal 56 to pass beyond the inner end of the by-pass port 72 so that further movement of piston 40 will begin further pressurization of the brake fluid in chamber 74 above the relatively low quick take-up pressure first generated. At about the same time, the quick take-up valve arrangement as found in the patents noted above opens communication to reservoir compartment 30 from chamber 48 so that fluid in that chamber is thereafter displaced into the reservoir compartment and provides no substantial resistance to further actuating movement of the piston 40.

The brake actuating pressure built up in chamber 74 is delivered to brake circuit 14. It also acts on the rear face of secondary pressurizing piston 42, and particularly the rear face of its rear land 80. As piston 42 is moved forwardly, spring 138 is compressed and the valve lip 128 is engaged by the valve seat 130, closing off the center compensation valve. This action disconnects secondary pressurizing chamber 96 from bore 102 as well as annular chamber 94 and tube passage 206. Therefore secondary pressurizing chamber 96 is disconnected from the chamber 48 and the reservoir compartment 30 and brake actuating pressure can be built up in it.

Further leftward movement of secondary pressurizing piston 42 carries the center compensation valve retainer 112 with it, also compressing inner spring 136. This piston movement pressurizes the brake fluid in chamber 96 and provides brake actuating pressure in brake circuit 16.

Upon release of the master cylinder, secondary springs 136 and 138 and primary spring 64 urge their pistons rearwardly, as do the pressures in the brake circuits and the pressurizing chambers. When inner secondary spring 136 reaches the position where it is no longer preloaded, it holds the center compensation valve retainer 112 in the axial position shown in the drawing while piston 42 moves a little further rightwardly. This moves valve seat 130 away from lip valve member 128, opening the center compensation valve and permitting flow of brake fluid from chamber 96 past the lip 128 into the annular space 126, through the cross passage 106 into chamber 94 while also continuing through tube passage 206, primary pressurizing piston bore 200, cross passage 202, chamber 48, rear compensation port 70 and the quick take-up valve to the reservoir compartment 30. At about the same time, the lip of seal 56 has moved rearwardly of bypass port 72, and any remaining pressure in chamber 74 is relieved to the reservoir through that port. The master cylinder is then in the released position illustrated. There is fluid communication available between the reservoir compartment and the pressurizing chambers and the brake circuits for compensation purposes It is important to have such communication after a brake actuation because of thermal changes in the brake system as the brakes cool off.

As in the structure of the above identified patent application, the elimination of the compensation and bypass ports through the master cylinder bore wall for the secondary pressurizing chamber protects the seal 92 against damage. This is more important when wheel lock control systems are used, as described in that patent application.

The embodiments of the invention in which an exclusive property or privilege is claimed are defined as follows:

1. In a master cylinder assembly having a master cylinder body with a bore therein, a brake fluid reservoir, a primary pressurizing piston and a secondary pressurizing piston each having a front face and a rear face, a primary pressurizing chamber defined by the wall of said bore and said front face of said primary pressurizing piston and said rear face of said secondary pressurizing piston, said primary pressurizing chamber being adapted to be connected to a first brake circuit for brake actuation and release, a secondary pressurizing chamber defined by the wall of said bore and said secondary pressurizing piston front face, said secondary pressurizing chamber being adapted to be connected to a second brake circuit for brake actuation and release, a primary and a secondary piston return spring preloaded in compression and respectively acting on said primary and secondary pressurizing pistons to continually urge said pistons to the master cylinder fully released position, a center compensation valve member having a forwardly extending pin part and a rearwardly extending pin part, said rearwardly extending pin part having a reduced diameter portion, said secondary pressurizing piston having a bore therein receiving said rearwardly extending pin part of said center compensation valve member, the wall of said secondary pressurizing piston bore and said center compensation valve member rearwardly extending pin part defining an annular space formed there between, said secondary pressurizing piston having a valve seat thereon selectively engageable by and disengageable from said valve member to open and close fluid connection between said secondary piston bore and said secondary pressurizing chamber, and an inner secondary spring located in said secondary pressurizing chamber and acting on said valve member to close said fluid connection upon forward movement of said secondary pressurizing piston from its released position; the improvement comprising:
    a tube having a passage therethrough and one tube end affixed to said secondary pressurizing piston and forming a rearward continuation of said secondary pressurizing piston bore;
    said primary pressurizing piston having a bore therein in axial alignment with said secondary pressurizing piston bore and said tube and slidably receiving said tube therein, and a passage in said primary pressurizing piston operatively maintaining fluid compensation connection of said primary pressurizing piston bore and said tube passage with said brake fluid reservoir.

2. The improvement of claim 1 further comprising a seal located in said primary pressurizing piston bore and sealing said primary piston bore relative to the outer surface of said tube.

3. In a master cylinder assembly having a master cylinder body with a bore therein, a brake fluid reservoir, a primary pressurizing piston and a secondary pressurizing piston defining with the wall of the bore a primary pressurizing chamber adapted to be connected to a first brake circuit and a secondary pressurizing chamber adapted to be connected to a second brake circuit for brake actuation and release, a primary and a secondary pressurizing piston return spring preloaded and respectively acting on the primary and secondary pressurizing pistons to continually urge those pistons to the master cylinder fully released or rest position, a secondary compensation bypass valve having a first valve element on said secondary pressurizing piston positioned radially inward of the bore wall, a second valve element supported on said secondary pressurizing piston for limited movements coaxially therewith and for limited movements relative to said first valve element, passage means including said secondary compensation bypass valve and said secondary pressurizing chamber connecting the second brake circuit and the interior of the reservoir with fluid communication through said passage means being controlled by the closing and opening of said secondary compensation bypass valve, and an inner secondary spring acting on said second valve element to urge it axially toward a position relative to said first valve element at which when said master cylinder is at rest said valve elements are spaced apart so as to keep said passage means open, said secondary pressurizing piston being moved upon initial secondary pressurizing piston actuating movement against the force of said secondary return spring to engage said first and second valve elements and close said passage means, with further secondary pressurizing piston actuating movement compressing said secondary pressurizing piston return spring and said inner secondary spring and pressurizing brake fluid in said secondary pressurizing chamber, said first valve element upon release of said master cylinder to its released position occurring being moved axially away from said second valve element by movement of said secondary pressurizing piston to its released position so as to open said valve and thus open said passage means and permit fluid flow between said second brake circuit and the interior of the reservoir while said master cylinder remains in its fully released position; the improvement comprising:
    said passage means including a first piston bore extending through said secondary pressurizing piston and in fluid communication with said secondary pressurizing chamber under control of said compensation valve;
    a tube having a passage therethrough and one tube end secured in said first piston bore and forming a rearward continuation of said first piston bore;
    said primary pressurizing piston having a second piston bore therein in axial alignment with said first piston bore and said tube and slidably receiving said tube therein, and a passage in said primary pressurizing piston operatively maintaining fluid compensation connection of said second piston bore and said tube passage with said brake fluid reservoir.

4. In a master cylinder having a fluid reservoir and a body, a first bore in said body open at one end and closed at the other end, a first piston and a second piston sealingly and reciprocably received in said first bore in axially tandem relation, said first piston having axially spaced first and second lands connected by a reduced diameter connector portion and said second piston having at least one land, said first piston lands and connector portion defining with said bore a compensation chamber axially intermediate said first piston first and second lands and adjacent said first bore open end, said body having a compensation port operatively connecting said reservoir and said compensation chamber, said first and second pistons defining with said bore a primary pressurizing chamber axially between said pistons, check valve means associated with said first piston second land and permitting compensation fluid flow from said compensation chamber to said primary pressurizing chamber and preventing fluid flow from said primary pressurizing chamber to said compensation chamber, said second piston defining with said first bore a secondary pressurizing chamber adjacent said first bore closed end, center compensation valve means in said second piston, and first and second piston return springs respectively located in said primary and secondary pressurizing chambers and respectively urging said pistons to the master cylinder released position; the improvement comprising:
- a second bore extending through said second piston between said secondary pressurizing chamber and said primary pressurizing chamber and having said center compensation valve means fluid connected therewith to keep said second bore open when the master cylinder is in the released position and to close said second bore against transmission of fluid flow and pressure therethrough when the master cylinder is actuated;
- a third bore in said first piston extending through said first piston first land and at least a part of the axial length of said first piston connector portion, said first piston having a passage formed therein intersecting said third bore and connecting said third bore with said compensation chamber in fluid pressure flow and pressure transmitting relation;
- and a tube extending through said first pressurizing chamber and having a passage therethrough, one end of said tube being secured in said second bore and the other end of said tube being reciprocably and sealingly received in said third bore, said tube passage fluid connecting said second and third bores and said tube preventing fluid connection of said second and third bores to said first pressurizing chamber;
- compensation fluid from said reservoir for both of said pressurizing chambers first flowing through said compensation port only and thereafter within said first bore, with the compensation fluid for said primary pressurizing chamber flowing within said first bore through said compensation chamber and said check valve means, and the compensation fluid for said secondary pressurizing chamber flowing within said first bore through said compensation chamber, said intersecting passage, said third bore, said tube passage, said second bore and said center compensation valve means to said secondary pressurizing chamber.

5. The invention of claim 4 in which said compensation chamber is also a quick take-up pressurizing chamber with said first piston second land being larger in diameter than said first piston first land and said first bore adjacent said first bore open end having an enlarged diameter receiving said first piston first land, said check valve means transmitting quick take-up pressure to said primary pressurizing chamber from said quick take-up chamber during initial actuation of the master cylinder, said cross passage and said third bore and said tube passage and said second bore also transmitting quick take-up pressure to said secondary pressurizing chamber from said quick take-up chamber during initial actuation of the master cylinder.

* * * * *